United States Patent [19]

Starp

[11] 3,709,137
[45] Jan. 9, 1973

[54] AUTOMATIC SHUTTER CONTROLLING DEVICE PARTICULARLY FOR PHOTOGRAPHIC AND MOVING PICTURE APPARATUS

[75] Inventor: Franz W. R. Starp, Calmbach/Black Forest, Germany

[73] Assignee: Prontor-Werk Alfred Gauthier G.m.b.H., Calmbach/Schwarzwald, Germany

[22] Filed: April 9, 1970

[21] Appl. No.: 26,961

[52] U.S. Cl. ................................95/64 D, 95/10 CD
[51] Int. Cl. ............................G03b 9/06, G03b 7/10
[58] Field of Search ..95/10 CE, 10 CD, 53 E, 53 EB, 95/63, 64 R, 64 D

[56] References Cited

UNITED STATES PATENTS 3,411,421 11/1968 Bestenreiner ......................95/10 CE
3,533,346 10/1970 Erlichman ..........................95/53 EB

*Primary Examiner*—Samuel S. Matthews
*Assistant Examiner*—Russell E. Adams, Jr.
*Attorney*—March Le Fever and Wyatt

[57] ABSTRACT

An automatic diaphragm aperture control device designed especially for photographic and moving picture apparatus is provided with a control device for manual or light-dependent selection of the diaphragm aperture value. The control device has a step-by-step electromagnetic mechanism for the control of the diaphragm aperture value and a pulse generator operably connected to the step-by-step electromagnetic switch mechanism for actuation thereof to control the diaphragm aperture value. An electrical gate circuit is placed before the pulse frequency generator to allow the generator to execute a predetermined number of switching steps.

14 Claims, 8 Drawing Figures

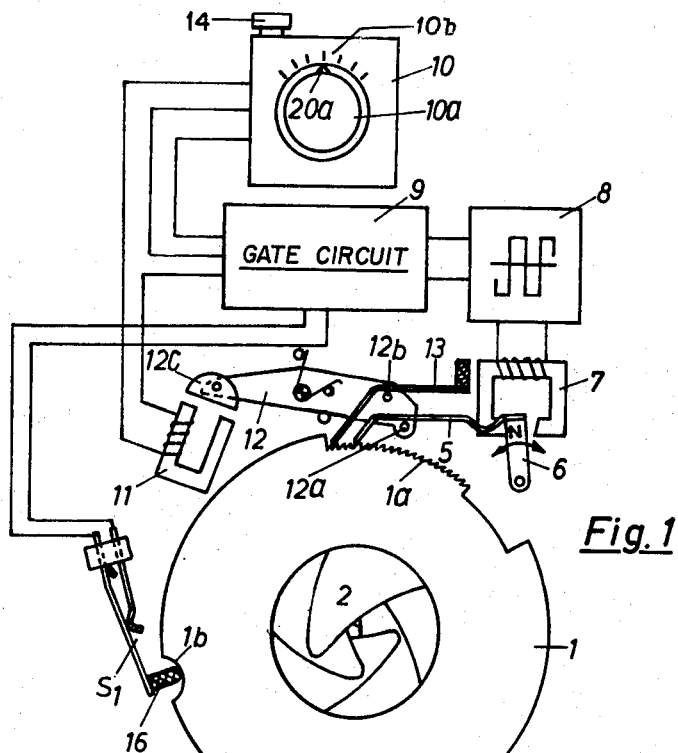
*Fig.1*
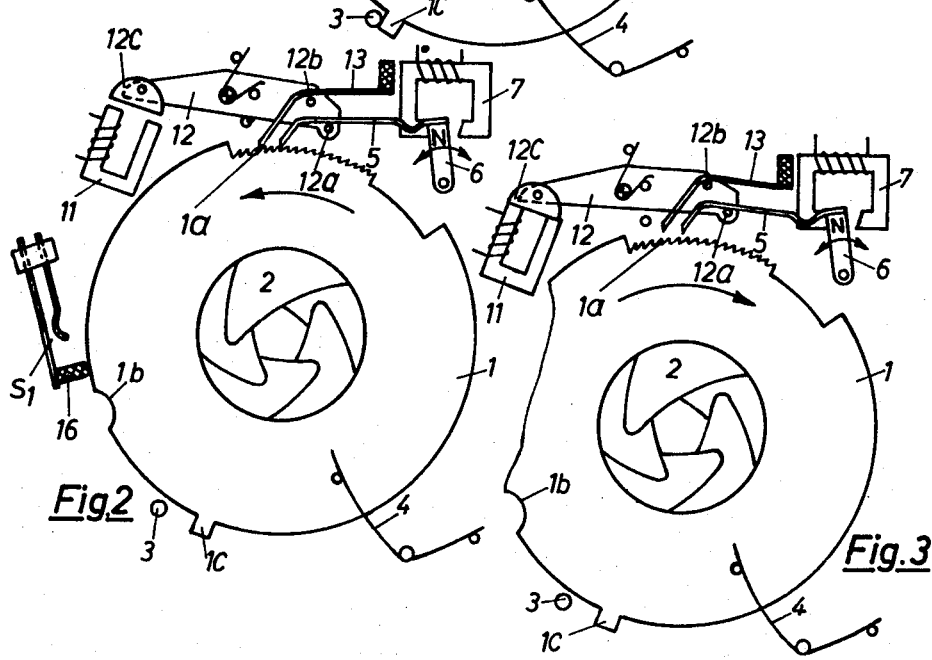
*Fig.2*      *Fig.3*
INVENTOR
Franz W. R. Starp
BY
March, LeFever & Wyatt
ATTORNEYS

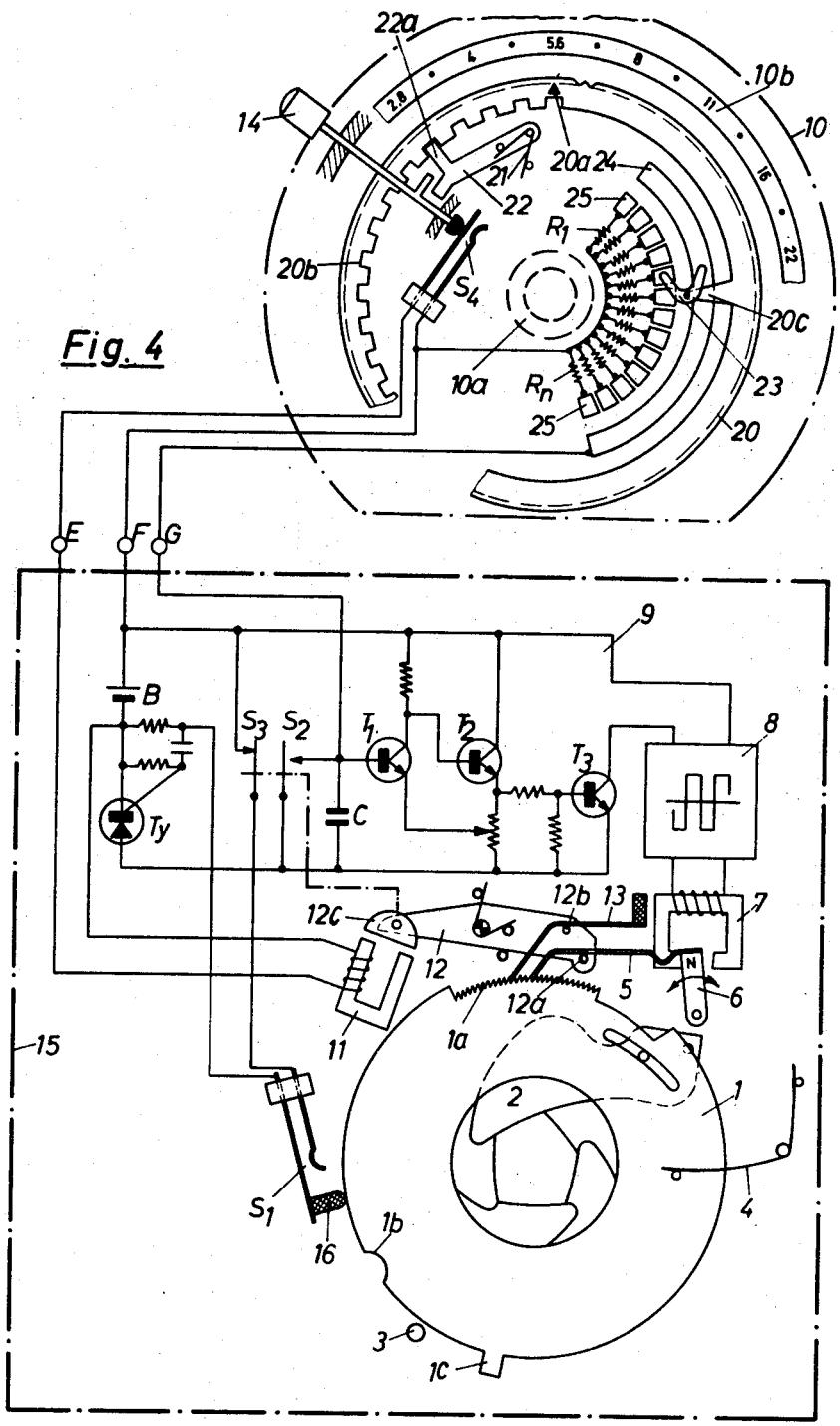

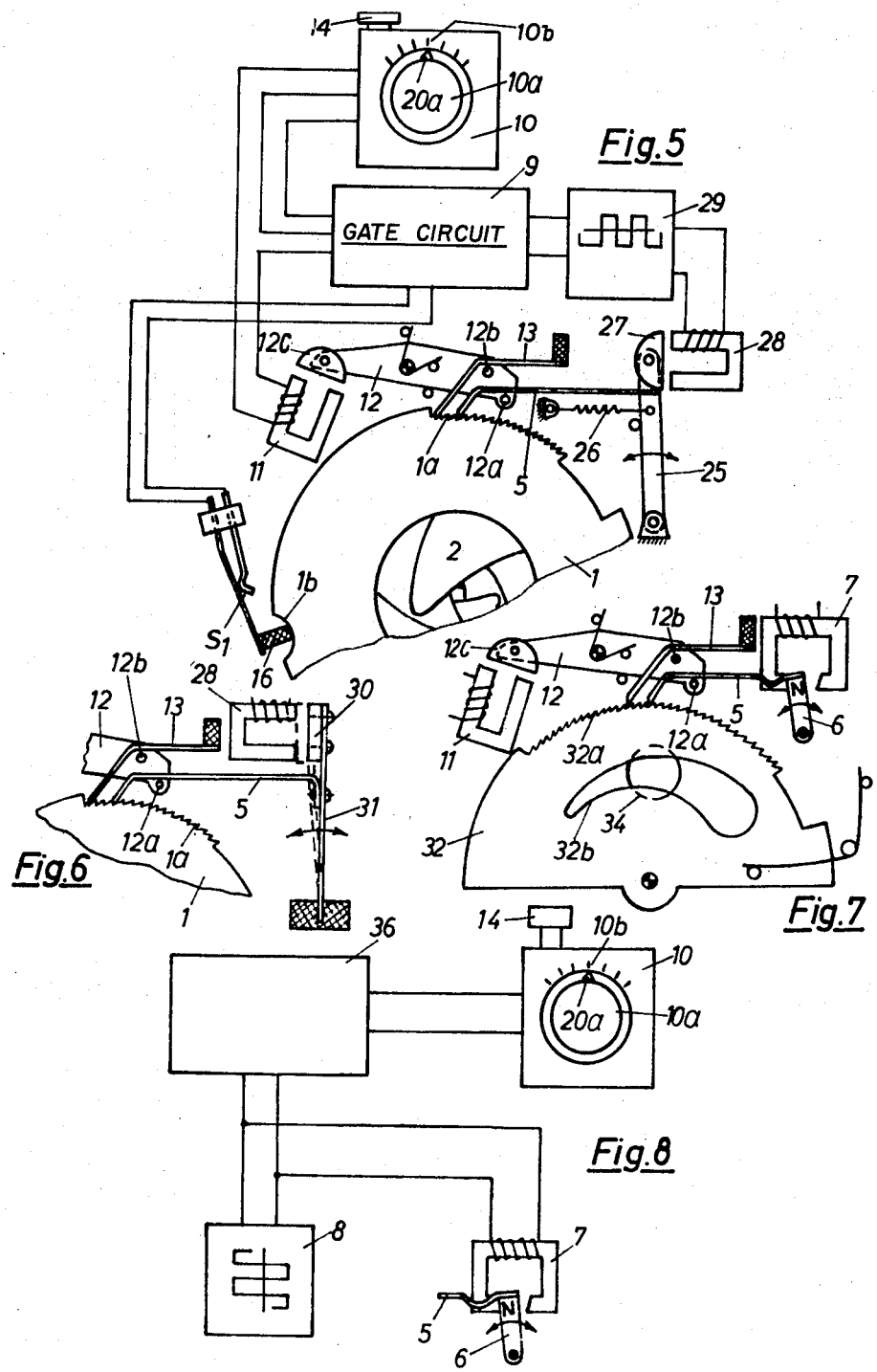

AUTOMATIC SHUTTER CONTROLLING DEVICE PARTICULARLY FOR PHOTOGRAPHIC AND MOVING PICTURE APPARATUS

FIELD OF THE INVENTION

The present invention relates to an automatic diaphragm control mechanism more particularly for photographic and cinematic apparatus incorporating manual or illumination-dependent control of the diaphragm aperture.

BACKGROUND OF THE INVENTION

Proposals concerning the design of devices for the automatic control of the aperture mechanism of photographic or cinematic apparatus by means of an electric motor drive have long been known. These known electric motor aperture controls could be used hitherto only to a very small extent in practice, preferably in substandard (narrow) film cameras, mainly due to the fact that the required performance of such electric motor drives is considerable and necessitates the use of several batteries of high capacity. For directly driving an aperture mechanism, an electric motor with a normal relatively high speed of rotation is not immediately suitable, due to the fact that rapid movements of the aperture mechanism cannot be controlled with the necessary exactness and can therefore easily lead to incorrect settings. This can be remedied only by an additional intermediate gear reducing the speed of the motor, and this in any case demands in turn considerable expense and space for accommodation thereof. If, in addition, it is desired to control the diaphragm aperture by a motor operated in dependence on the lighting, this necessarily involves fitting an exposure meter or galvanometer cooperating with a scanning device in the camera. Due to the sensitivity of the meter to mechanical influences, such as impacts and vibration, and also on account of the necessary additional space for accommodation, attempts are being made to produce automatic diaphragm aperture control means making it possible to omit a metering mechanism.

SUMMARY OF THE INVENTION

The object to be achieved by means of the present invention is to avoid the disadvantages of conventional electric motor control mechanisms i.e., to provide a simply constructed automatic diaphragm aperture control mechanism capable of being accommodated in a shutter or camera case, which control means makes it possible to omit the electric motor and any additional reduction gear, with relatively low power consumption. Conditions should also be such as to provide a control means for the diaphragm system dependent on ambient lighting without a metering mechanism.

In accordance with the present invention, a pulse generator and a conventional electromagnetic step-by-step mechanism actuated by the generator, are provided to control the diaphragm, and an electric gate circuit permitting the generator to come into action to carry out a certain number of switching steps is associated with the pulse generator. In this manner an automatic diaphragm control mechanism is provided, complying in every respect with practical requirements and which, among other things, renders possible immediate adjustment of the diaphragm mechanism by the drive mechanism while avoiding the use of an electric motor and a mechanical intermediate gear. Due to the rapidly succeeding propelling steps acting on the diaphragm mechanism, it is possible to use a relatively small driving unit suitable for incorporating in a shutter or camera case. If the setting device used for pre-selecting the aperture value is accommodated separately in a casing and a current feed is established with the control and driving mechanism in the photographic or cinematic apparatus by way of electric leads, the diaphragm aperture can be remotely controlled from a distance.

BRIEF DESCRIPTION OF THE DRAWINGS

How this is achieved in detail together with the advantages arising from the construction of the invention, is described hereinafter with reference to several embodiments illustrated in the accompanying drawings in which:

FIG. 1 is a view showing schematically and in the starting position, an aperture mechanism initially adjustable by means of a remote control device to a certain aperture, the mechanism being moved by means of an electromagnetic mechanical step-by-step mechanism to the prescribed aperture, FIGS. 2 and 3 are partial views corresponding to FIG. 1 showing the aperture mechanism and the step-by-step mechanism, the aperture mechanism being driven as shown in FIG. 2 by the step-by-step mechanism in the direction shown by the arrow while, in FIG. 3, after reaching the opening corresponding to the prescribed aperture, it is released to return to the starting position in the direction shown by the arrow, FIG. 4 is a detailed view of a transistorized resistance-capacitance timing circuit which is associated with the frequency generator serving to actuate the step-by-step mechanism for the diaphragm mechanism, FIG. 5 is a variant of the electro-magnetic mechanical step-by-step mechanism which is shown in FIGS. 1 to 4, the armature lever of which is spring-loaded in one direction of rotation, FIG. 6 shows another embodiment of the step-by-step mechanism comprising an armature lever formed as a leaf-spring, FIG. 7 shows the use of an electromagnetic step-by-step mechanism for actuating the diaphragm mechanism, and which is formed from a rotatable shutter disc which has a progressively enlarging slit sweeping past the camera lens opening during rotation of the disc, and FIG. 8 is a schematic view of an automatic diaphragm control with a step-by-step mechanism actuated by a pulse pre-selecting and counting device which interrupts the operation of the frequency generator automatically when a pre-determined number of pulses is reached.

DESCRIPTION OF THE PREFERRED EMBODIMENTS

In FIG. 1 a rotatable ring, displaces several blades 2 of a diaphragm mechanism in known manner from a zero or starting position with minimum or maximum opening to another position with an intermediate opening. In the embodiment according to FIGS. 1–5, the arrangement of the diaphragm mechanism is such that the segments swing out from the smallest diaphragm opening to a larger opening when the actuating ring 1 moves out of a starting position determined by a stationary pin 3. A spring 4 engaging on the actuating ring 1 serves to return the ring and the diaphragm blades 2 to the starting position. There are saw-tooth-like serrations 1a on the ring 1 with which the free bent end of a pawl 5, used for the step by step movement of the ring 1 and actuated by an electric motor, engages. The pawl 5, part of a step by step mechanism, is mounted on a permanent magnet 6 which is pivoted to swing like a pendulum. The freely swinging end (indicated by N — north pole) projects between the poles of an electromagnet 7 consisting of a magnetizing coil and a soft iron core. Associated with this electromagnet and suitably battery-driven, is a generator 8 which is constructed as a conventional square wave generator and delivers, to the electromagnet 7, pluses of constantly reversing polarity (alternating current) so that the permanent magnet 6 carrying the pawl 5 is reciprocated between the two poles of the electromagnet 7. Associated with the rectangular pulse generator 8, as shown in FIG. 1, is a gate circuit 9 serving to determine and/or limit the time interval during which the generator 8 delivers pulses to the electromagnet 7 to oscillate the permanent magnet 6.

The pre-selection of the time interval, determining the required aperture and within which the generator 8 delivers its actuating pulses, is effected by means of a regulating device 10 which is only shown schematically in FIG. 1, and is described in greater detail hereinafter with reference to FIG. 4. This regulating device is fitted with regulating members for influencing the duration of the pulse generation, and is constructed as an automatic remote control unit. For this purpose, this device is connected both to the gate circuit 9 of FIG. 1 as a timing circuit, and to another electromagnet 11. The latter serves to actuate an unlocking mechanism 12, also described in greater detail hereinafter and acting on the above mentioned step by step mechanism 5–7 and a locking pawl 13 associated therewith. The object of the locking pawl 13 associated with this step by step mechanism is to prevent the actuating ring 1 from making a return movement during the forward step by step movement produced by the pawl 5.

The above-described electromagnetic aperture actuating mechanism with its electric control means operates in such manner that, after the pre-selection of a required aperture by means of a setting button 10a provided on the regulating device 10 in conjunction with a scale 10b, the electromagnet 7 is energized with alternating current from the generator 8 for a definite time interval to set the predetermined aperture. The alternating pulses supplied to the electromagnet 7 effect an oscillating movement of the permanent magnet 6 which in turn moves the actuating ring 1 step by step in the direction of the arrow shown in FIG. 1. As soon as the gate voltage 9 associated with the generator 8 reaches a value corresponding to the desired aperture, the current to the generator 8 and, consequently, the actuation of the electromagnet 7 is momentarily interrupted.

Since the pawl 13, which acts to lock the actuating ring 1 against a reverse direction of rotation, drops into the teeth 1a after each driving step, both the actuating ring 1 and the diaphragm blades 2 retain their adjusted position when the drive stops, a feature which is necessary for perfect operation of an aperture mechanism. If, subsequently after the aperture mechanism has fulfilled its purpose, the push button 14 is actuated, which has to be done in each case and independently of whether a change of the setting button 10a to a different aperture value of the scale 10b is required or not, electromagnet 11 is energized, resulting in actuation of the armature lever 12. By means of pins 12a and 12b provided on this lever, both the pawl 5 and the locking pawl 13, as shown in FIG. 3, are raised from the teeth 1a. This has the result that the actuating ring 1 is moved under the influence of the spring 4 in a direction of rotation opposed to the previous direction of movement, whereby the blades 2 are again transferred to the starting position shown in FIG. 1. On release of the push button 14 and the closure of switch $S_1$ by the notch 1b on the actuating ring 1, the electromagnet 11 is de-energized, and the armature lever 12 returns once more to the position shown in FIG. 1 and consequently drops both the drive pawl 5 and the locking pawl 13 back into the teeth 1a of the actuating ring 1.

As shown in FIG. 4, a timing circuit having a transistorized RC circuit is used for controlling the electromagnetic step by step mechanism 5–7 used for the drive of the aperture mechanism. Accurate setting results are achieved with this circuit in connection with the step by step mechanism, since it determines a precise time interval during which actuating pulses are delivered. The time control circuit can be located in the same casing, such as a shutter or camera case, which accommodates the aperture mechanism 1, 2 and the step by step mechanism 5–7. This casing is shown only symbolically in FIG. 4 by a frame 15 indicated by chain dotted lines. In the same figure, the other frame indicated by 10, and also formed of chain dotted lines, indicates the regulating device connected to the timing circuit by electric leads. Since the regulating device 10 is intended to be an independent unit and detachable from the shutter or camera case, terminals E, F and G are provided by which the leads of the regulating device 10 are connected to corresponding leads of the timing circuit. The terminals E, F and G are preferably made in the form of plug and socket connections. The leads may be of any desired length, subject to the limitation of the voltage drop which would result from excessive length. Because of the separation of the regulating device from the timing circuit and the electromagnetically actuated aperture mechanism, an automatic remote control of the aperture system of photographic or cinematic apparatus projectors or the like can be provided.

The step by step mechanism and the aperture mechanism in FIG. 4 correspond to the arrangement already shown in FIGS. 1–3. Therefore the same reference numerals may be used for the same parts. FIG. 4 shows that the timing circuit is actuated from a battery B and is formed as a trigger circuit comprising transistors $T_1$, $T_2$ and $T_3$. Together with the other electrical components used in the circuit, such as the capacitor C and one of the resistors $R_1$–$R_n$, these transistors fulfil the function of an electronic switch which determines the time interval in which the electromagnet 7 is supplied with pulses from generator 8. The switch $S_2$ acts as a short circuiting switch across the capacitor C, and switch $S_3$ acts as a capacitor charge starting switch. The two switches $S_2$ and $S_3$ are linked with and actuated by the armature lever 12 or the armature 12c by means of suitable mechanical connecting members indicated by chain dotted lines in FIG. 4, so that, in the released position of the armature lever 12, the switch $S_2$ is open and the switch $S_3$ is closed. When the electromagnet 11 attracts the armature 12c on closure of the switch $S_4$ it moves the armature lever 12 and the switch $S_2$ is closed, while the switch $S_3$ opens. The switch $S_1$ rests slidably with its insulated actuating member 16 on the circumference of the actuating ring 1 and is thus open. The switch $S_4$ is located in the regulating device 10 and is so arranged therein that it is closed when a desired aperture value is set on the scale 10b to initiate the setting of the aperture.

The regulating device 10 is a mechanism by means of which the aperture mechanism 1, 2 is remotely controlled. The device comprises an aperture setting ring 20 which is fixed to the setting button 10a. It has a mark 20a which has to be set opposite the required value on the scale 10b to obtain a corresponding aperture opening. The aperture setting ring is also provided with a locking device 20b which may be made as a coarse or fine locking device. In the embodiment shown in FIG. 4 the aperture setting ring 20 has rectangular notches, the spacing of which corresponds to half-stop stages. If an infinitely variable aperture adjustment is required, a set of fine serrations instead of the coarse locking arrangement, or even a friction clamping device can be used. Co-operating with the push button 14 which actuates the switch $S_4$ is a locking lever 22 which is displaceable against the bias of a spring 21 and, by means of a tooth 22a engaging in the notches 20b, arrests the aperture setting ring 20 in any selected setting position. The aperture setting ring 20 is also provided with an arm 20c carrying an insulated slider 23. By way of a blade spring this slider 23 makes contact with an arcuate conductor 24 associated therewith. Another blade spring makes contact with one of the contact plates 25 according to the setting of the aperture ring 20. For each possible locking position of the aperture setting ring 20 there is a contact plate 25 to which one of the resistors $R_1$-$R_n$ is connected. This means that the resistor whose contact plate 25 is engaged by the slider 23 is included in the transistorized timing circuit by way of the slider 23, the conductor path 24, the terminal G and a lead and terminal F. According to the embodiment shown in FIG. 4, the battery B can be accommodated either in the shutter or camera case 15 or in the regulating device 10. However it would also be possible to provide a separate case for the battery and to connect this battery case with the case 15 or to the remote control device 10 itself by suitable leads.

The operation of the aperture control mechanism will be described hereinafter in greater detail with reference to the embodiment shown in FIG. 4.

If the photographer intends to change the regulating device 10 to another aperture value than that already set, he must first operate the push button 14. The effect of this is that the switch $S_4$ is closed. This energizes the magnet 11, and the armature 12c is attracted. The consequence of this is that the pins 12a and 12b disengage the drive pawl 5 and the locking pawl 13 from the teeth 1a. The actuating ring 1 is then able to turn clockwise under the action of the spring 4 until the lug 1c provided thereon strikes against the stationary abutment 3. The diaphragm aperture is then at minimum. The switch $S_1$ is also closed, because its actuating member 16 has dropped into the notch 1b. In addition, the armature lever 12 reverses the two switches $S_2$ and $S_3$. $S_2$ is closed and discharges any charge still present in the capacitor C. In addition, the switch $S_3$ is opened by the movement of the armature lever 12. Since this happens just before the closure of the switch $S_1$ and since both switches are in series, the lead from the positive pole of the battery B to the firing electrode of the thyristor Ty is interrupted.

It is immaterial to the circuit operation whether the setting of the aperture setting ring 20 is changed before the release of the push button 14, or not. It is only important that the push button 14 is released again after its actuation. Apart from the engagement of the locking lever 22, the result of this is that switch $S_4$ is once more opened. This de-energizes magnet 11 and releases its armature 12c, so that the armature lever 12 returns to its normal position by spring action. This movement of the armature lever 12 enables the two pawls 5 and 13 to engage the teeth 1a of the actuating ring 1. Furthermore, the switches $S_2$ and $S_3$ are returned to their previous positions. This means that the capacitor C is no longer short-circuited by $S_2$. Since the switch $S_3$ is in series with $S_1$ and both are closed, this causes the firing electrode of the thyristor Ty to receive a firing voltage so that the thyristor Ty becomes conductive to energize the trigger circuit comprising the transistors $T_1$–$T_3$. Transistor $T_3$ comes first into action to supply generator 8 with current. In turn, the generator supplies the coil of electromagnet 7 with alternating current pulses, causing the permanent magnet 6 to swing to-and-fro between the poles of the soft iron core and thus oscillate the drive pawl 5 which by engagement with the teeth 1a of the actuating ring 1, rapidly and intermittently steps said ring 1. This operation lasts until the actuation of the circuit is stopped by the charging of the capacitor C in the RC circuit, which blocks transistor $T_3$.

Since the resistor in the RC circuit is selected from the series $R_1$ to $R_n$ and is adjusted to a value of the diaphragm scale 10b, the stepping operation lasts only until the blades 2 have reached a position corresponding to the pre-selected scale value. Due to the blocking of the transistor $T_3$ the current in thyristor Ty drops sufficiently for the latter to block also. The firing electrode circuit is then also interrupted by the opening of the switch $S_1$ when the actuating ring 1 is initially stepped.

According to the embodiment shown in FIG. 5, which is similar to the above described arrangement, the drive pawl is secured to a lever 25 pivoted to swing like a pendulum in order to achieve oscillating movements. The lever 25, is biassed by a return spring 26 and carries an armature 27 at its free end which cooperates with an electromagnet 28. The latter receives stepping pulses at rapid intervals from a square wave generator 29 with which a gate circuit 9 of the above mentioned type is associated. When the electromagnet 28 is subjected to a current pulse, it attracts the armature 27 against the bias of the spring 26, the drive pawl 5 first sliding over one tooth and dropping into the next. At the termination of the pulse in the magnet 28, the spring 26 retracts the armature and advances the aperture actuating ring 1 by one tooth division. This is repeated until the flow of current to the generator 29 is interrupted according to the aperture value pre-set on the regulating device 10. An advantage of this arrangement is that the electromagnet 28 can be driven by a square wave generator 29 supplying only direct current pulses. With regard to its mode of operation and manipulation there is complete agreement between the arrangement shown in FIG. 5 and that shown in FIG. 1.

In accordance with the embodiment shown in FIG. 6, the slide pawl driving mechanism is simplified by securing the armature 30 co-operating with the electromagnet 28 to a clamped leaf-spring 31 constructed as an armature lever. The leaf-spring 31 carries at its free end a drive pawl 5 which co-operates with the teeth 1a of an aperture actuating ring 1 in the same manner as already described above. When the electromagnet 28 receives a current pulse, a magnetic field is built up therein which attracts the armature 30 while simultaneously deforming the leaf-spring 31. The pawl 5 at the same time moves the actuating ring 1 one step on. In this embodiment also an unlocking mechanism form of the armature lever 12 and a locking pawl 13 preventing premature return of the diaphragm system, are associated with the thrust pawl driving mechanism.

According to FIG. 7, automatic aperture control can be applied to an aperture mechanism having a pivoted shutter disc 32. This shutter disc is provided with teeth 32a on its periphery, and a progressively enlarging slit 32b which passes over an opening 34 in front of the objective lens when the disc moves. Actuation of the shutter disc 32 may be effected with any one of the step by step mechanisms shown in FIGS. 1–6. The application is not limited therefore to any particular embodiment of a step by step mechanism. The aperture system provided with a slit is preferred when it is important to keep the moving masses to a minimum.

Finally, FIG. 8 is a schematic view of an automatic diaphragm control in which a switch pulse pre-selecting device 36 is used for setting the aperture value preselected on the regulator device 10, this preselecting device being constructed so that switch pulses delivered by the square wave generator 8 to the electromagnet 7 are imparted simultaneously to a conventional pulse counter forming part of the pre-selection device. This pulse counter registers and counts the switch pulses and ensures that, when a pre-selected number of pulses is reached corresponding to the preselected aperture value, interruption of the pulses to the magnet occurs. The step by step mechanism serving to drive the diaphragm mechanism consists of a pawl 5, electromagnet 7 and oscillating permanent magnet 6. The advantage of this arrangement is that a fixed number of switch pulses is associated with each diaphragm setting so that incorrect setting results cannot occur.

Having thus described my invention I claim:

1. An automatic diaphragm aperture control device, especially for photographic apparatus having a variable aperture diaphragm and setting means for selecting the diaphragm aperture value, comprising, in combination, electromagnetically actuated stepping means operable to step said diaphragm to a selected aperture value; a pulse generator connected to said stepping means and operable to supply stepping pulses thereto; and gating means controlled by said setting means and connected to said generator and controlling the duration of energization thereof in accordance with the diaphragm aperture value selected by said setting means.

2. An automatic diaphragm aperture control device, as claimed in claim 1, in which said pulse generator is a square wave generator; said electromagnetically actuated stepping means comprising a magnetizable core having a pair of opposite polarity pole faces defining an air gap; a magnetizing winding on said core and connected to said pulse generator for supply of stepping pulses to said magnetizing winding; a permanent magnet; means mounting said permanent magnet for oscillation with one pole thereof disposed in said air gap for oscillation of said permanent magnet responsive to pulses supplied to said magnetizing winding; and a driving pawl secured to the free end of said permanent magnet and operable to step said diaphragm responsive to oscillation of said permanent magnet in said air gap.

3. An automatic diaphragm aperture control device, as claimed in claim 2, in which said diaphragm is formed with ratchet teeth on its periphery; said pawl comprising a flat spring secured at one end to the free end of said permanent magnet and having a free end engageable with said ratchet teeth.

4. An automatic diaphragm aperture control device, as claimed in claim 3, including a fixedly mounted stop pawl engageable with said ratchet teeth to prevent retrograde movement of said diaphragm during stepping of the latter by said driving pawl.

5. An automatic diaphragm aperture control device, as claimed in claim 4, in which said stop pawl is a flat spring having one end fixedly mounted and having a free end engaging with said ratchet teeth.

6. An automatic diaphragm aperture control device, as claimed in claim 1, wherein said gating means includes a source of potential; a transistorized RC timing circuit connected to said source and having a resistance value adjustable by said setting means; the resistance of said timing circuit controlling the duration of energization of said pulse generator; said pulse generator comprising a relaxation oscillator; a transistor amplifier connecting said timing circuit to said relaxation oscillator, and further including a feedback circuit comprising a capacitor.

7. An automatic diaphragm aperture control device, as claimed in claim 6, in which said timing circuit includes a plurality of fixed value resistors each operable to determine a respective duration of energization of said pulse generator; said setting means including a switch, adjustable relative to an aperture scale, and operable to connect a respective one of said fixed resistors into said timing circuit in accordance with the aperture value selected by said setting means.

8. An automatic diaphragm aperture control device, as claimed in claim 6, wherein the resistance of said timing circuit comprises a potentiometer.

9. An automatic diaphragm aperture control device, as claimed in claim 1, in which said pulse generator is a square wave generator; a pulse counter, adjustable to count a predetermined number of pulses, connected to said generator; said generator simultaneously supplying said stepping pulses to said pulse counter; said pulse counter being connected to said stepping means and immediately interrupting supply of stepping pulses to said stepping means when said pulse counter registers a predetermined number of pulses as adjusted by said setting means.

10. An automatic diaphragm aperture control device, as claimed in claim 1, including an electromagnetically actuated release means operatively associated with said electromagnetically actuated stepping means and operable, when actuated, to disconnect said stepping means from said diaphragm; and an unlocking switch controlling energization of said electromagnetically actuated release means and selectively operable to actuate said release means to disconnect said stepping means from said diaphragm in advance of operation of said stepping means to step said diaphragm to a selected aperture value.

11. An automatic diaphragm aperture control device, as claimed in claim 10, in which said diaphragm is formed with ratchet teeth on its periphery; said electromagnetically actuated stepping means including a drive pawl operable to engage said ratchet teeth to step said diaphragm and further including a stop pawl operable to engage said ratchet teeth to prevent retrograde motion of said diaphragm during stepping thereof by said drive pawl; said release means comprising a two-arm lever pivotally mounted intermediate its ends; and armature secured to one end of said lever; respective pins cooperable with said drive pawl and with said locking pawl secured to the other end of said lever; and an electromagnet operatively associated with said armature and energized responsive to actuation of said unlocking switch to attract said armature to pivot said two-arm lever to disengage said drive pawl and said locking pawl from said ratchet teeth.

12. An automatic diaphragm aperture control device, as claimed in claim 1, in which said stepping means comprises an electromagnet having an energizing winding supplied with stepping pulses by said pulse generator; said gating means including a transistorized RC timing circuit controlling the duration of energization of said pulse generator; said stepping means further including a pivoted lever and an armature mounted on the free end of said lever and cooperating with said electromagnet; spring means biasing said armature in opposition to said electromagnet; said diaphragm having ratchet teeth on its periphery; and a drive pawl carried by said lever and cooperable with said ratchet teeth to step said diaphragm responsive to oscillation of said lever.

13. An automatic diaphragm aperture control device, as claimed in claim 12, wherein said pivoted lever comprises a flat spring anchored at one end; said drive pawl also comprising a spring secured at one end to said flat spring.

14. An automatic diaphragm aperture control device, as claimed in claim 7, in which said setting means and said gating means are accommodated in respective separate housings; and disengageable electric lead means interconnecting said setting means and said gating means.

* * * * *